No. 629,003. Patented July 18, 1899.
R. G. COX.
COMBINED SHOVEL, POKER, AND TONGS.
(Application filed Feb. 7, 1899.)
(No Model.)
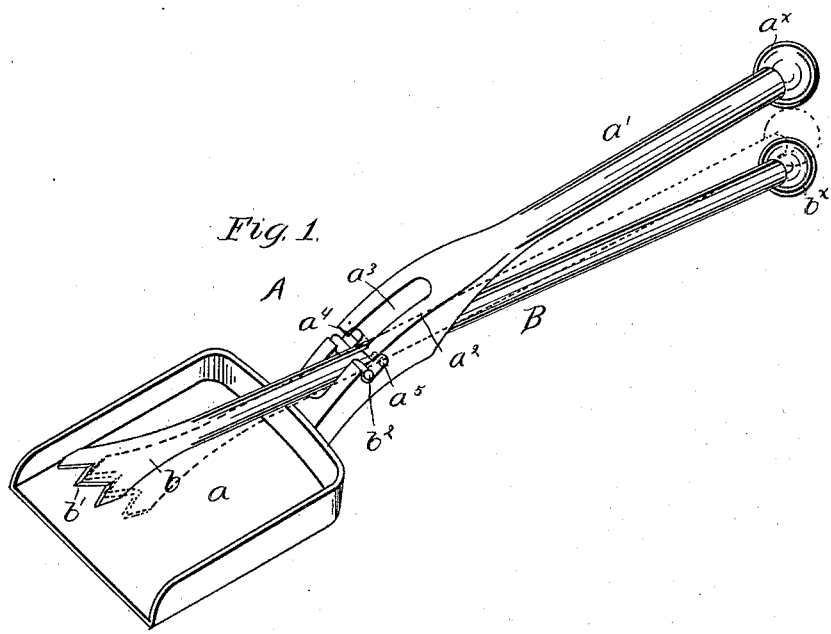
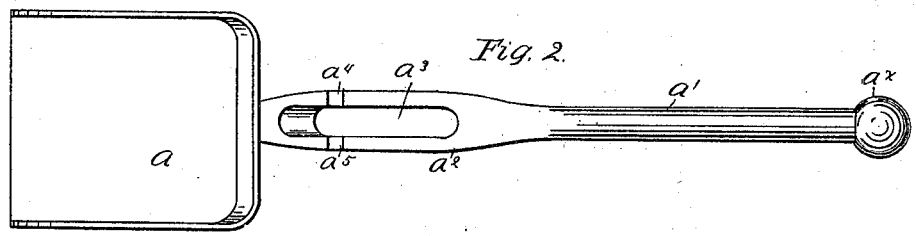
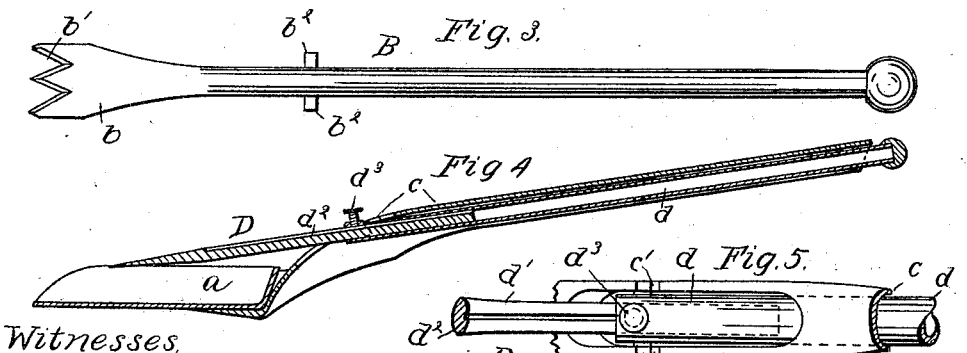
Witnesses
Inventor
Robert G. Cox
By Rich'd H. Manning
Att'y

UNITED STATES PATENT OFFICE.

ROBERT G. COX, OF URICH, MISSOURI.

COMBINED SHOVEL, POKER, AND TONGS.

SPECIFICATION forming part of Letters Patent No. 629,003, dated July 18, 1899.

Application filed February 7, 1899. Serial No. 704,772. (No model.)

*To all whom it may concern:*

Be it known that I, ROBERT G. COX, a citizen of the United States of America, residing at Urich, in the county of Henry and State of Missouri, have invented a certain new and Improved Combined Shovel, Poker, and Tongs; and I do hereby declare that the following is a full, clear, and exact description of the invention, reference being had to the accompanying drawings, forming a part of this specification.

The object of the invention is a novel union of a shovel and poker, so as to afford a convenient implement for extracting live coals from the grate or stove and enable their conveyance without liability of falling to the floor.

The invention consists in the novel construction and combination of parts, such as will be first fully described, and then specifically pointed out in the claims.

In the drawings, Figure 1 is a view in perspective of a shovel embodying the invention. Fig. 2 is a plan view of the shovel as seen in Fig. 1 with the poker removed. Fig. 3 is a detail view of the poker, showing the journals. Fig. 4 is a vertical sectional view of the scoop of the shovel, showing an alternate construction of the handle and the telescopic poker. Fig. 5 is a broken plan view of the handle of the shovel and poker as seen in Fig. 4.

Similar letters of reference indicate corresponding parts in all the figures.

Referring to the drawings, A represents a shovel for the convenient handling of coals, &c., of which $a$ is the scoop, which is shown of considerable width, and $a'$ the handle-bar. From the rear end of the scoop the portion $a^2$ of the handle-bar connected therewith extends rearwardly and upwardly from the plane of the scoop in a single outwardly-curved line and from thence in a straight line, terminating in a knob $a^\times$. In said portion $a^2$ of the handle-bar $a'$ is a vertical slot $a^3$, extending rearwardly from a point near the connection with the scoop $a$ in the longitudinal direction of the handle $a'$. In the upper side of the curved portion $a^2$ of the handle, the proper distance from the scoop $a$ and upon each side of the slot $a^3$, is a depression or bearing $a^4$, which is also grooved at $a^5$ rearwardly in the line of direction of the handle $a'$.

B represents the poker, which consists of a straight bar nearly the same length as the shovel A, one end of which bar is flattened at $b$, and in said flattened portion are teeth or serrations $b'$. At the other end of the bar is knob $b^\times$. Upon each side of the poker, at a point about one-third the distance from the portion $b$ toward the other end of the poker, is a pivot $b^2$, which pivot is in the same horizontal plane as the flattened portion $b$ of the poker. The said end portion $b$ of the poker is extended in an edgewise direction from a position beneath the handle $a'$ of the shovel through the slot $a^3$ in the portion $a^2$ of the handle-bar $a'$ of the shovel, and also the pivots $b^2$, in which position the poker is turned in the slot, so as to bring the portion $b$ of the poker in the same plane as the scoop $a$ and the pivots $b^2$ caused to enter the depressions $a^4$ in the portion $a^2$ of the handle-bar.

In the employment of the shovel for the handling of the coals or slag from coal the outer end of the poker, which overbalances the end portion $b$, takes a position as indicated in dotted lines in Fig. 1, and upon raising said outer end the substance upon the scoop is held by the compression of the portion $b$ of the poker from accidental movement, both the handle $a'$ and the outer end of the poker being within the grasp of the hand, the pivots $b^2$ moving rearwardly in the rearwardly-grooved depressions $a^5$ in the said portion $a^2$ of the handle $a'$ automatically, which depressions act as a fulcrum for the poker. When the service of the poker alone is required, the poker is detached, as in Fig. 3, by the raising of the pivots from the depressions $a^4$ and turning the poker in position so as to withdraw the same from the slot $a^3$.

In order to make the poker a permanent fixture with the shovel for various uses, I make the handle of the shovel recessed or grooved longitudinally upon its under side, as seen at C in Figs. 4 and 5.

The poker D consists of two telescopic parts $d\ d'$. The part $d$ consists of a tube which fits within the recess or groove $c$ in the under side of the handle, the forward end extending to the recesses $c'$ in the curved portion $c^2$ of the handle and having pivots $c^3$ on each side of the said tubular portion of the poker, being fulcrumed in recesses the same as described in Fig. 1. The lower portion $d'$ of the poker is flattened at the outer end, as seen at $b$, Fig. 3, the other end being round and extending within or telescoping with the hollow portion $d$ of the poker D. In the upper side of the portion $d'$ of the poker is a longitudinal groove $d^2$, and in the lower end of the tube $d$ is a set-screw $d^3$, which extends within the groove $d^2$. The portion $d'$ of the poker may upon releasing the set-screw $d^3$ be moved rearwardly, so as to be away from contact with substances in the scoop when not in use and moved forward to grasp the substances at various points within the scoop in rear of the forward edge. In order to detach the poker from the handle $c$, it is only necessary to remove the set-screw $d^3$ from the portion $d$ of the poker, when the poker is detachable in like manner as described of poker B.

The invention is adapted in a large or small scale for handling of metal during its reduction by heat, the removal of articles from bakers' ovens, and slag from furnaces, and various other uses to which it may be applied advantageously.

Having fully described my invention, what I now claim as new, and desire to secure by Letters Patent, is—

1. An implement comprising separate jaws and handle-bars connected with said jaws, one of said bars having an outwardly-curved longitudinally-slotted portion, and depressions in the sides of said slot, grooved rearwardly in the line of direction of said handle, and pivots upon the other bar adapted to be seated in the grooved depressions of the opposing bar.

2. An implement comprising a scoop and its handle-bar, said handle-bar having an outwardly-curved longitudinally-slotted portion connected with the scoop, and depressions in the sides of said slotted portion grooved rearwardly in the line of direction of said handle and a separate bar or poker in said slot extending to the said scoop, and pivots upon said poker adapted to be seated in the said grooved depressions in the handle-bar.

ROBERT G. COX.

Witnesses:
   H. A. STEWART,
   J. POWERS.